June 6, 1944.   G. E. FORD   2,350,741
INDICATING INSTRUMENT HAVING MAGNETIC BIASING MEANS
Filed Dec. 23, 1942

INVENTOR.
George E. Ford
BY Harold E. Stonebraker,
ATTORNEY.

Patented June 6, 1944

2,350,741

UNITED STATES PATENT OFFICE 2,350,741

INDICATING INSTRUMENT HAVING MAGNETIC BIASING MEANS

George E. Ford, Rochester, N. Y., assignor to Rochester Manufacturing Co., Inc., Rochester, N. Y., a corporation of New York Application December 23, 1942, Serial No. 469,879

14 Claims. (Cl. 73—110)

This invention relates to an indicating instrument, with more particular reference to the type of construction that includes a pointer or indicator movable over a scale and mounted on an oscillatory arbor that is operated by suitable means such as a pressure diaphragm, and in which the arbor is controlled and held in its initial position by a hairspring, and it has for its purpose to eliminate the necessity of such a spring control and to afford magnetic instrumentalities for returning the pointer and supporting arbor to initial position.

There are various objections to the conventional spring-return means employed in conjunction with the pointer of indicating instruments, such as the cost and difficulty in assembling a fine hairspring which can easily be bent or damaged by any slight contact, the likelihood of breakage due to resonant frequencies set up in the spring by vibrations which also cause the pointer and supporting arbor to vibrate making the instrument difficult to read and resulting in excessive wear, and it is a particular purpose of the invention to afford a magnetic return mechanism for an indicating instrument pointer that eliminates all the objections incidental to a hairspring control and also functions more efficiently by bringing about a uniformly steady movement of the pointer and insuring its proper return to initial position when released.

With the conventional hairspring control of a pointer and supporting arbor, the spring exerts least pressure when the pointer is in its initial position and during the early part of its travel while the greatest pressure is exerted at the end of the pointer travel when the spring is under its maximum tension, all of which is contrary to the most desirable action since generally in indicating instruments such as pressure gauges and the like, the operating mechanism of the instrument usually develops the greatest power at the beginning of the pointer travel and the least power at the end of the pointer travel, the power of the operating mechanism becoming less as the pointer moves toward the end of the scale, and it is a further object of the invention to accomplish this preferred result by magnetic return mechanism that will be opposed to and similar in its action to the power of the mechanism that moves the pointer, the magnetic action being greatest when the pointer is in its initial position and decreasing as it travels toward its limit of movement over the scale, thus functioning more efficiently than is possible with a hairspring return mechanism.

In some instances after a spring-controlled indicating instrument has been used for a time, the operating mechanism may become slightly distorted from overload or other cause and as a result fail to return the pointer fully to its initial or "zero" position, and it is an additional object of the invention to overcome this objection by a magnetic mechanism that insures to a greater extent the proper return of the pointer by imposing the greatest magnetic effect when the pointer is in initial or "zero" position.

A further purpose of the invention is to afford a magnetic return mechanism in which the pointer is held in its initial or "zero" position by the attraction between magnetic poles of opposite polarity and is acted upon when in its extreme or furthermost indicating position by the repelling action between magnetic poles of like polarity which tends to move the pointer and supporting arbor away from such extreme position, thus enabling the practical adaptation of a magnetic return mechanism to an indicating instrument in which the pointer and supporting arbor travel through a path or range of movement of more than 180° and as high as 240° or more.

Still another object of the invention is to provide a magnetic return mechanism that is especially adapted to a pressure gauge employing a pressure diaphragm which through a crank mechanism operates a gear segment and pinion to oscillate a supporting arbor on which the pointer is mounted and in which increasing pressures are likely to cause irregular movement of the pointer toward the end of the scale, the magnetic mechanism functioning to eliminate any backlash in the gearing and to bring about a steady uniform movement of the supporting arbor and pointer throughout the entire path of travel.

To these and other ends, the invention consists in the construction and arrangement of parts that will appear clearly from the following description when read in conjunction with the accompanying drawing, the novel features being pointed out in the claims following the specification.

The invention may be applied to any instrument utilizing an oscillatory arbor carrying a pointer movable over an indicating scale, and it is here shown as embodied in a pressure gauge in which a rectilinear movement of a pressure diaphragm is converted into a rotary movement through a crank shaft and gearing, the invention having certain marked advantages in connection with such a mechanism.

Figure 4:
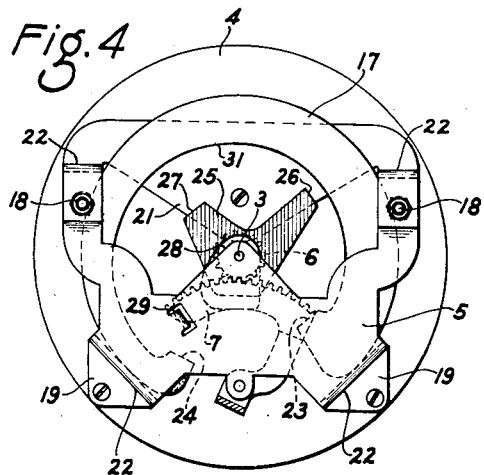
Fig. 4 is a horizontal sectional view looking in the direction opposite to Fig. 3 showing the magnetic mechanism with the movable magnet in a position that it assumes while moving between its extreme limits of travel.

Referring more particularly to the drawings in which like reference numerals refer to the same parts throughout the several views, the structure shown includes a pointer 1 that is movable over an indicating scale or dial 2 and is fixedly mounted on an arbor 3, the latter being journalled in the dial plate 4 and the back plate 5, see Fig. 4.

Also fixed on the arbor 3 is a pinion 6 that is driven by a gear segment 7, the latter forming part of a bracket that includes an extension 8 and is pivotally supported between the dial plate 4 and back plate 5. The extension 8 includes an arm 9 that is engaged and moved by a crank 11 formed as part of a crank shaft 12 that is suitably journalled in the housing and includes a crank 13 that is engaged and moved by a stud 14 forming part of the pressure diaphragm 15 that is moved in accordance with pressure variations, as usual in this type of instrument, the pressure movements being conveyed by the mechanism and gearing just described to the pointer 1.

The parts just described are constructed and arranged within a housing as disclosed in Patent No. 2,123,532, July 12, 1938, the general relation of the driving mechanism between the pressure diaphragm and pointer being old, and whereas in such previous constructions the arm 9 has been held against the crank 11 by a hairspring connected to the pointer supporting arbor and acting to return the pointer to its initial position and to take up backlash between the gear segment and pinion, the present invention accomplishes these same results in a more efficient manner through the instrumentality of magnetic mechanism governing the arbor in the manner that will now be described.

Surrounding the arbor 3 and spaced therefrom is a stationary arc-shaped magnet 17 of thin metal plate located just under the back plate or support 5 and supported thereby through fastening pins 18, the back plate 5 being attached to the dial plate 4 by means of feet 19 and base portion 21 located adjacent to and secured to the back of the dial plate 4. The back plate 5 is spaced from the dial plate by the legs or connecting portions 22.

The stationary magnet 17 extends around the arbor through more than 180° and preferably through a distance of approximately 240° as shown, to permit movement of the pointer over an indicating scale or dial of wide range, and is provided at its forward and rear ends with radially projecting poles 23 and 24 respectively which are of opposite polarity, pole 23 being a north pole and pole 24 being a south pole for a purpose that will appear presently.

The stationary magnet controls the pointer supporting arbor 3, effecting its return to initial position and eliminating backlash in the gearing through the instrumentality of a movable magnet that is mounted on the arbor 3. The movable magnet is designated at 25 and consists of a thin metal plate which preferably includes a plurality of poles arranged around the movable magnet and spaced approximately 90° apart as indicated at 26 and 27 respectively, while 28 designates a counterbalance of a form such as illustrated secured to the movable magnet to insure equal distribution of weight around the axis of the arbor and uniform regular movement of the latter.

The poles 26 and 27 on the movable magnet are of opposite polarity and are so situated on the movable magnet that one of the poles is attracted by the pole at the forward end of the stationary magnet and is repelled by the pole at the rear end of the stationary magnet while the other pole on the movable magnet is repelled by the pole at the forward end of the stationary magnet when the pointer and arbor reach the extreme limit of their travel.

Figure 1:
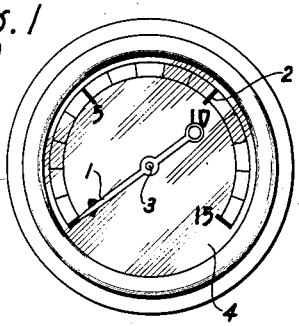
Fig. 1 is a plan view of a conventional pressure gauge to which the invention may be applied.
Figure 6:
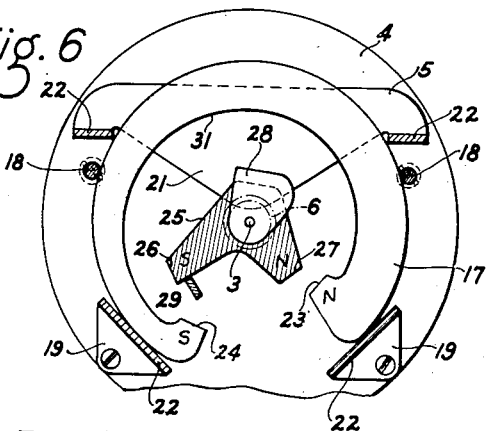
Fig. 6 is a view similar to Fig. 5, showing the position of the movable magnet when the pointer has reached the extreme limit of its travel.
Figure 3:
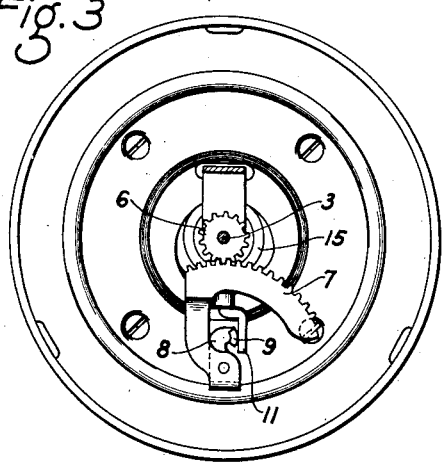
Fig. 3 is a horizontal sectional view taken just above the gear segment and the pinion operated thereby and fixed on the supporting arbor, the magnetic mechanism being omitted for clearness.
Figure 2:
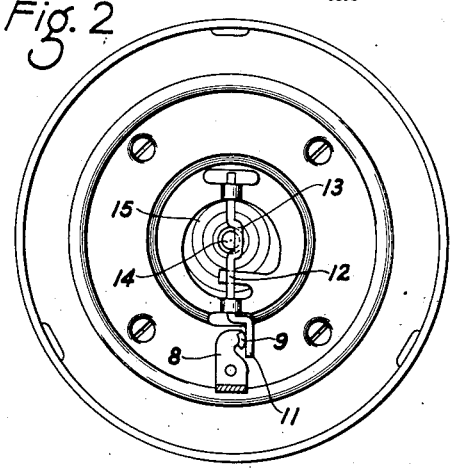
Fig. 2 is a horizontal sectional view through the instrument shown in Fig. 1, the central portion of the pressure diaphragm, the crank shaft operated thereby, and the crank engaged arm on the gear segment appearing in elevation.
Figure 5:
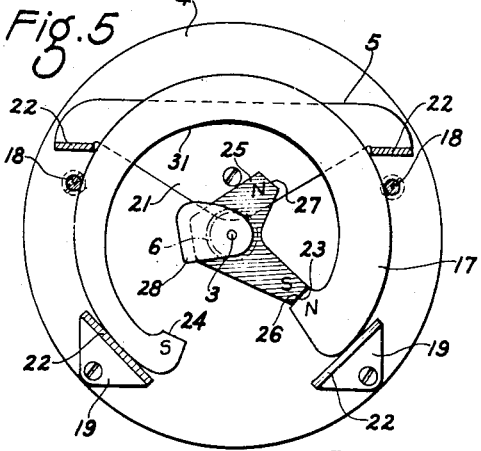
Fig. 5 is a horizontal sectional view looking in the same direction as Fig. 4, showing the magnetic mechanism in elevation with the movable magnet in its initial position when the pointer is at the "zero" point of the scale.

The poles 26 and 27 are preferably shaped as shown, pole 26 being a south pole and pole 27 a north pole, and the relationship is such that when the pointer is in its initial position opposite to the "zero" indication on the scale, pole 26 is in contact with pole 23 on the stationary magnet which attracts pole 26 of the movable magnet and holds the latter in such position. The contact between poles 23 and 26 just described limits the return movement of the pointer and arbor as shown in Fig. 5, while Fig. 6 shows the position of the movable magnet when the pointer has traveled over the indicating scale to its extreme position, at which time the pole 27 of the movable magnet is in proximity to and repelled by pole 23 of the stationary magnet while pole 26 of the movable magnet is repelled by pole 24 of the stationary magnet. Further movement of the movable magnet in this direction is limited by a stop in the form of a lug 29, see Fig. 4, extending from the back plate 5 into the path of the outer end of the pole 26 on the movable magnet, the pole 27 being of such length as to clear the stop 29 during rotation of the magnet 25.

By this construction, a magnetic force is set up that tends to actuate the movable magnet in a reverse direction away from its extreme position even through the arbor is turned through more than 180°, the repelling action between the like poles being sufficient to cause the movable magnet to start its travel along the return path and to move until the attracting force of pole 23 of the stationary magnet exerts sufficient pull on pole 26 of the movable magnet to bring the latter to its initial position where it is retained by the pole 23.

Thus the greatest pull is exerted on the movable magnet when the latter is in its initial position and the greatest force exerted to hold the arbor during the early part of its travel when the maximum power is imposed by the pressure mechanism, whereas the pull from the stationary magnet on the movable magnet becomes less as the latter travels around the stationary magnet toward the rear end of the latter. In order to increase this action still further by the mechanical relationship of the parts, the inner edge 31 of the stationary magnet is formed eccentrically with relation to the rotary axis of the arbor 3 and movable magnet. The eccentric relation of the inner edge 31 of the stationary magnet is such that said inner edge is closer to the movable magnet at its forward end and is at an increasingly greater distance as the rear end of the stationary magnet is approached. As a consequence, the air gap between the pole 26 and the stationary magnet increases as pole 26 moves away from the forward end of the stationary magnet and toward the rear end of the latter. The attraction between the opposite poles 23 and 26 becomes increasingly less as they are separated a greater distance, while the repelling action between the like poles is sufficient to actuate the movable magnet away from its extreme position at the limit of its travel and effect its return movement.

While the invention has been described with relation to a specific embodiment, it is not confined to the details shown and the form of the stationary and movable magnets may be modified or other changes made without departing from the essential features of the invention, and this application is intended to cover any modifications or departures that may come within the purposes of the improvement or the scope of the following claims.

I claim:

1. In an indicating instrument, the combination with an oscillatory arbor and a pointer fixed thereon, the arbor and pointer being movable from zero position through an arc of more than 180°, and mechanical operating means connected to the arbor, of means for returning the arbor to initial position comprising an arc-shaped stationary magnet extending around the arbor through more than 180° and with its outer edge arranged concentrically to the arbor, said stationary magnet being provided at its forward and rear ends with poles of opposite polarity, and a movable magnet mounted on the arbor and having a pole which when in initial position is attracted by and engages the pole at the forward end of the stationary magnet and is movable into proximity to and repelled by the pole at the rear end of the stationary magnet when the pointer reaches the limit of its travel.

2. In an indicating instrument, the combination with an oscillatory arbor and a pointer fixed thereon, the arbor and pointer being movable from zero position through an arc of more than 180°, and mechanical operating means connected to the arbor, of means for returning the arbor to initial position comprising an arc-shaped stationary magnet extending around the arbor through more than 180° and with its outer edge arranged concentrically to the arbor, said stationary magnet being provided at its forward and rear ends with radially extending poles of opposite polarity, and a movable magnet mounted on the arbor and having a pole that is movable into engagement with and attracted by the pole at the forward end of the stationary magnet and movable into proximity to and repelled by the pole at the rear end of the stationary magnet.

3. In an indicating instrument, the combination with an oscillatory arbor and a pointer fixed thereon, the arbor and pointer being movable from zero position through an arc of more than 180°, and mechanical operating means connected to the arbor, of means for returning the arbor to initial position comprising an arc-shaped stationary magnet extending around the arbor through more than 180° and with its outer edge arranged concentrically to the arbor, said stationary magnet being provided at its forward and rear ends with radially extending poles of opposite polarity, and a movable magnet mounted on the arbor and having a plurality of poles of opposite polarity which are spaced apart approximately 90° and when the pointer reaches its limit of travel are located in proximity to and repelled by the poles at the forward and rear ends of the stationary magnet respectively.

4. In an indicating instrument, the combination with an oscillatory arbor and a pointer fixed thereon, and mechanical operating means connected to the arbor, of means for returning the arbor to initial position comprising an arc-shaped stationary magnet extending around the arbor through more than 180° and provided at its forward and rear ends with radially extending poles of opposite polarity, and a movable magnet mounted on the arbor and having a plurality of poles of opposite polarity spaced approximately 90° apart, one of said last mentioned poles being attracted and repelled respectively by the poles at the forward and rear ends of the stationary magnet and the other of said poles on the movable magnet being repelled by the pole at the forward end of the stationary magnet when the pointer reaches its limit of travel.

5. In an indicating instrument, the combination with an oscillatory arbor and a pointer fixed thereon, the arbor and pointer being movable from zero position through an arc of more than 180°, and mechanical operating means connected to the arbor, of means for returning the arbor to initial position comprising an arc-shaped stationary magnet extending around the arbor through more than 180° and with its outer edge arranged concentrically to the arbor, said stationary magnet being provided at its forward and rear ends with poles of opposite polarity, and a movable magnet mounted on the arbor and having a plurality of poles of opposite polarity spaced from each other, one of the last mentioned poles being movable into engagement with and attracted by the pole at the forward end of the stationary magnet when in initial position and movable into proximity to and repelled by the pole at the rear end of the stationary magnet when the pointer reaches its limit of travel, and the other of said poles on the movable magnet being movable into proximity to and repelled by the pole at the forward end of the stationary magnet when the pointer reaches its limit of travel.

6. In an indicating instrument, the combination with an oscillatory arbor and a pointer fixed thereon, the arbor and pointer being movable through an arc of more than 180°, of an arc-shaped stationary magnet extending around the arbor through an arc of more than 180° and provided at its forward and rear ends with poles of opposite polarity, and a movable magnet mounted on the arbor and having a pole that is movable into proximity to and attracted and repelled respectively by the poles at the forward and rear ends of the stationary magnet, the outer edge of the stationary magnet being concentrically related to the axis of the arbor, and the inner edge of the stationary magnet being eccentrically related to the axis of the arbor whereby the air gap between the stationary magnet and the pole of the movable magnet increases as the latter travels away from initial position.

7. In an indicating instrument, the combination with an oscillatory arbor and a pointer fixed thereon, of an arc-shaped stationary magnet extending around the arbor through more than 180° and provided at its forward and rear ends with poles of opposite polarity and a movable magnet mounted on the arbor and having a plurality of poles of opposite polarity spaced approximately 90° apart, one of said last mentioned poles being attracted and repelled respectively by the poles at the forward and rear ends of the stationary magnet and the other of said poles on the movable magnet being repelled by the pole at the forward end of the stationary magnet when the pointer reaches the limit of its travel, the inner edge of the stationary magnet being eccentrically related to the axis of the arbor whereby the air gap between the stationary magnet and the movable pole that is attracted by the pole at the forward end of the stationary magnet increases as the movable pole travels away from initial position.

8. In an indicating instrument, the combination with a pressure operated diaphragm, a crank shaft operated thereby, a gear segment mounted for operation by the crank shaft, an oscillatory arbor, a pointer mounted thereon, the arbor and pointer being movable through an arc of more than 180°, and a pinion fixed on the arbor and driven by said gear segment, of an arc-shaped stationary magnet extending around the arbor through more than 180° and provided at its forward and rear ends with poles of opposite polarity, said stationary magnet having its outer edge arranged concentrically to the arbor, and a movable magnet mounted on the arbor and having a pole that is movable into proximity to and attracted and repelled respectively by the poles at the forward and rear ends of the stationary magnet.

9. In an indicating instrument, the combination with a pressure operated diaphragm, a crank shaft operated thereby, a gear segment mounted for operation by the crank shaft, an oscillatory arbor, a pointer mounted thereon, the arbor and pointer being movable through an arc of more than 180°, and a pinion fixed on the arbor and driven by said gear segment, of an arc-shaped stationary magnet extending around the arbor through more than 180° and provided at its forward and rear ends with poles of opposite polarity, said stationary magnet having its outer edge arranged concentrically to the arbor, and a movable magnet mounted on the arbor and having a plurality of poles of opposite polarity which are spaced apart and when the pointer reaches its limit of travel are located adjacent to and repelled by the poles at the forward and rear ends of the stationary magnet respectively.

10. In an indicating instrument, the combination with a pressure operated diaphragm, a crank shaft operated thereby, a gear segment mounted for operation by the crank shaft, an oscillatory arbor, a pointer mounted thereon, and a pinion fixed on the arbor and driven by said gear segment, of an arc-shaped stationary magnet extending around the arbor through more than 180° and provided at its forward and rear ends with poles of opposite polarity, said stationary magnet having its outer edge arranged concentrically to the arbor, and a movable magnet mounted on the arbor and having a plurality of poles of opposite polarity spaced approximately 90° apart, one of said last mentioned poles being attracted and repelled respectively by the poles at the forward and rear ends of the stationary magnet and the other of said poles on the movable magnet being repelled by the pole at the forward end of the stationary magnet when the pointer reaches the limit of its travel.

11. In an indicating instrument, the combination with a pressure operated diaphragm, a crank shaft operated thereby, a gear segment mounted for operation by the crank shaft, an oscillatory arbor, a pointer mounted thereon, the arbor and pointer being movable through an arc of more than 180°, and a pinion fixed on the arbor and driven by said gear segment, of an arc-shaped stationary magnet extending more than 180° around the arbor and provided at its forward and rear ends with poles of opposite polarity, and a movable magnet mounted on the arbor and having a plurality of poles of opposite polarity which are spaced apart and when the pointer reaches its limit of travel are located adjacent to and repelled by the poles at the forward and rear ends of the stationary magnet respectively, the outer edge of the stationary magnet being concentrically related to the axis of the arbor, and the inner edge of the stationary magnet being eccentrically related to the axis of the arbor whereby the air gap between the stationary magnet and the poles on the movable magnet increases as the latter travels away from initial position.

12. In an indicating instrument, the combination with a pressure operated diaphragm, a crank shaft operated thereby, a gear segment mounted for operation by the crank shaft, an oscillatory arbor, a pointer mounted thereon, the arbor and pointer being movable through an arc of more than 180°, and a pinion fixed on the arbor and driven by said gear segment, of an arc-shaped stationary magnet extending around the arbor through more than 180° and provided at its forward and rear ends with poles of opposite polarity, and a movable magnet mounted on the arbor and having a pole that is movable into proximity to and attracted and repelled respectively by the poles at the forward and rear ends of the stationary magnet, the outer edge of the stationary magnet being concentrically related to the axis of the arbor, and the inner edge of the stationary magnet being eccentrically related to the axis of the arbor whereby the air gap between the stationary magnet and the pole on the movable magnet increases as the latter travels away from initial position.

13. In an indicating instrument, the combination with a pressure operated diaphragm, a crank shaft operated thereby, a gear segment mounted for operation by the crank shaft, an oscillatory arbor, a pointer mounted thereon, and a pinion fixed on the arbor and driven by said gear segment, of an arc-shaped stationary magnet extending around the arbor through more than 180° and provided at its forward and rear ends with poles of opposite polarity, and a movable magnet mounted on the arbor and having a plurality of poles of opposite polarity spaced approximately 90° apart, one of said last mentioned poles being movable into proximity to and attracted and repelled respectively by the poles at the forward and rear ends of the stationary magnet and the other of said poles on the movable magnet being movable into proximity to and repelled by the pole at the forward end of the stationary magnet when the pointer reaches the limit of its travel, the outer edge of the stationary magnet being concentrically related to the axis of the arbor, and the inner edge of the stationary magnet being eccentrically related to the axis of the arbor whereby the air gap between the stationary magnet and the poles on the movable magnet increases as the latter travels away from initial position.

14. In an indicating instrument, the combination with an oscillatory arbor and a pointer fixed thereon, the arbor and pointer being movable through an arc of more than 180°, of an arc-shaped stationary magnet extending around the arbor through an arc of more than 180° with its outer edge arranged concentrically to the arbor and provided at its forward and rear ends with poles of opposite polarity, and a movable magnet mounted on the arbor and having a plurality of poles of opposite polarity spaced around the movable magnet, one of said last mentioned poles being movable into proximity to and attracted and repelled respectively by the poles at the forward and rear ends of the stationary magnet and the other of said poles on the movable magnet being movable into proximity to and repelled by the pole at the forward end of the stationary magnet when the pointer reaches the limit of its travel, the inner edge of the stationary magnet being eccentrically related to the axis of the arbor whereby the air gap between the stationary magnet and the pole on the movable magnet increases as the latter travels away from initial position.

GEORGE E. FORD.